(12) United States Patent
Leon

(10) Patent No.: US 8,753,153 B2
(45) Date of Patent: Jun. 17, 2014

(54) VARIABLE CANTED COIL SPRING CROSS SECTION

(75) Inventor: Gordon Leon, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 128 days.

(21) Appl. No.: 13/545,595

(22) Filed: Jul. 10, 2012

(65) Prior Publication Data

US 2012/0295471 A1 Nov. 22, 2012

Related U.S. Application Data

(63) Continuation of application No. 12/882,797, filed on Sep. 15, 2010, now Pat. No. 8,590,867.

(60) Provisional application No. 61/242,703, filed on Sep. 15, 2009.

(51) Int. Cl.
*H01R 13/33* (2006.01)

(52) U.S. Cl.
USPC ........................................................ 439/840

(58) Field of Classification Search
USPC ......... 439/840, 841, 843, 448, 578, 581–585, 439/595; 277/163, 166
See application file for complete search history.

(56) References Cited

U.S. PATENT DOCUMENTS

| | | | |
|---|---|---|---|
| 4,876,781 A | 10/1989 | Balsells | |
| 5,411,348 A * | 5/1995 | Balsells | ........................ 403/326 |
| 5,791,638 A | 8/1998 | Balsells | |
| 6,835,084 B2 * | 12/2004 | Poon et al. | ..................... 439/349 |
| 7,274,964 B2 * | 9/2007 | Balsells | .......................... 607/37 |
| 7,294,020 B2 * | 11/2007 | Zhao et al. | ..................... 439/627 |
| 7,914,351 B2 * | 3/2011 | Balsells et al. | ................ 439/840 |
| 2004/0070128 A1 | 4/2004 | Balsells | |

FOREIGN PATENT DOCUMENTS

EP 0890758 A2 1/1999

OTHER PUBLICATIONS

International Search Report completed May 25, 2011 and mailed May 30, 2011 from related International Application No. PCT/US2010/048980 filed Sep. 15, 2010 (4 pages).
Written Opinion completed May 25, 2011 and mailed May 30, 2011 from related International Application No. PCT/US2010/048980 filed Sep. 15, 2010 (6 pages).

* cited by examiner

*Primary Examiner* — R S Luebke
*Assistant Examiner* — Harshad Patel
(74) *Attorney, Agent, or Firm* — Klein, O'Neill & Singh, LLP

(57) ABSTRACT

A canted coil spring includes a plurality of canted coils generally canted relative to a centerline extending through the coils. At least one coil when viewed in the direction of the centerline appears to have a non-elliptical shape and a non-circular shape when the at least one coil is in the unbiased state. The plurality of coils is generally canted at a first coil angle relative to the center line. The at least one coil includes at least one section canted at a second coil angle relative to the centerline. The second coil angle is different from the first coil angle when the at least one coil is in an unbiased state.

25 Claims, 10 Drawing Sheets

US 8,753,153 B2

VARIABLE CANTED COIL SPRING CROSS SECTION

CROSS-REFERENCED TO RELATED APPLICATION

This is a continuation application of application Ser. No. 12/882,797, filed Sep. 15, 2010, now U.S. Pat. No. 8,590,867 which claims the benefit of the filing date of Provisional Application Ser. No. 61/242,703, filed Sep. 15, 2009, the contents of each of which are expressly incorporated herein by reference.

FIELD OF ART

The present application generally relates to canted coil springs, and more particularly, to methods, apparatus, and systems related to a canted coil spring having a variable canted coil spring cross section.

BACKGROUND

Conventional canted coil springs have tangential points of contact between each coil and one or more flat surfaces of a groove in which the spring is partly or fully received. The noted tangential points of contact are formed by the elliptical coils of the spring contacting the one or more flat surfaces of the groove. Because contact between the coils and the groove occurs at one or more points, a limited contact surface area is available for thermal and/or electrical conductivity.

SUMMARY

A canted coil spring according to aspects of the disclosure includes a plurality of canted coils generally canted relative to a centerline extending through the coils. At least one coil when viewed in the direction of the centerline comprises a non-elliptical shape and a non-circular shape when the at least one coil is in the unbiased state. The plurality of coils is generally canted at a first coil angle relative to the center line. At least one coil includes at least one section canted at a second coil angle relative to the centerline. The second coil angle is different from the first coil angle when the at least one coil is in an unbiased state.

A canted coil spring assembly or system according to aspects of the disclosure includes a groove having at least one flat surface and a canted coil spring comprising a plurality of canted coils generally canted relative to a center line extending through the coils. At least one coil when viewed in the direction of the centerline has a non-elliptical shape and a non-circular shape when the at least one coil is in the unbiased state. Furthermore, at least one coil contacts the at least one flat surface with a greater contact area when the at least one coil is in the unbiased state than an unbiased coil of a similar canted coil spring having an elliptical shape or a circular shape.

A method of manufacturing a canted coil spring according to aspects of the disclosure comprises fabricating a wire in a canted helical configuration thereby forming a plurality of coils canted at a first coil angle relative to a centerline extending through the coils, and bending at least one section of at least one coil to a second coil angle relative to the centerline. The first coil angle is different from the second coil angle when the at least one coil is in an unbiased state.

DESCRIPTION OF DRAWINGS

These and other features and advantages of the present assemblies and methods will become appreciated as the same become better understood with reference to the specification, claims and appended drawings briefly described below.

DETAILED DESCRIPTION

The detailed description set forth below in connection with the appended drawings is intended as a description of embodiments of a canted coil spring having a variable canted coil spring cross section and methods for making the same and is not intended to represent the only forms in which the present assemblies and methods may be constructed or used. The description sets forth the features and the steps for using and constructing the canted coil springs and methods in connection with the illustrated embodiments. It is to be understood, however, that the same or equivalent functions and structures may be accomplished by different embodiments that are also intended to be encompassed within the spirit and scope of the assemblies and methods. As denoted elsewhere herein, like element numbers are intended to indicate like or similar elements or features.

As used herein, a cross-sectional shape of a coil of a canted coil spring refers to the shape of the coil as it appears when viewed in the direction of a centerline C extending through the canted coil spring.

Figure 1A:
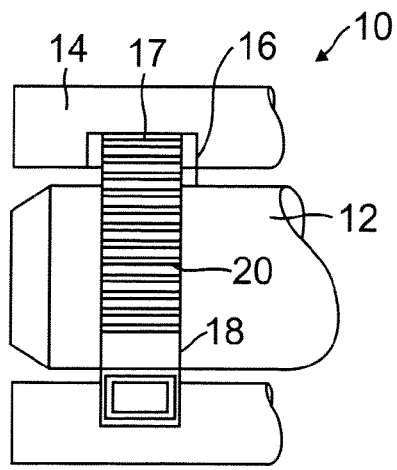
FIG. 1A is a cross-sectional view of an exemplary connector with a canted coil spring.
Figure 1B:
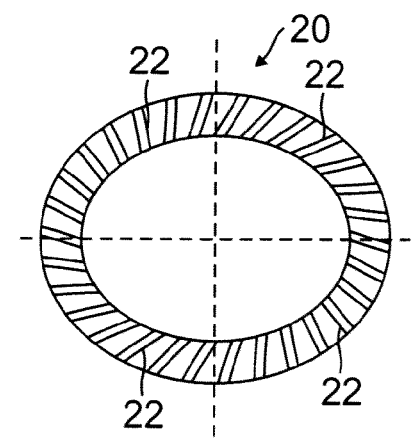
FIG. 1B is a top view of the canted coil spring of FIG. 1A.
Figure 1C:
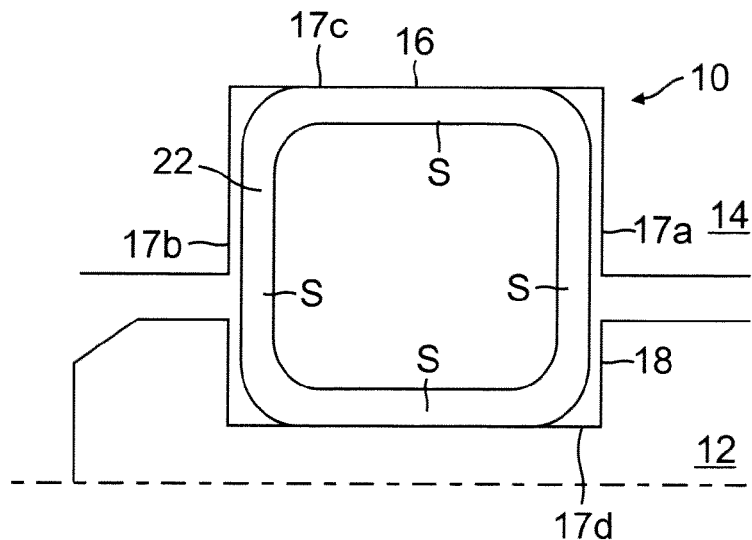
FIG. 1C is another cross-sectional view of the connector of FIG. 1A with the canted coil spring.
Figure 1D:
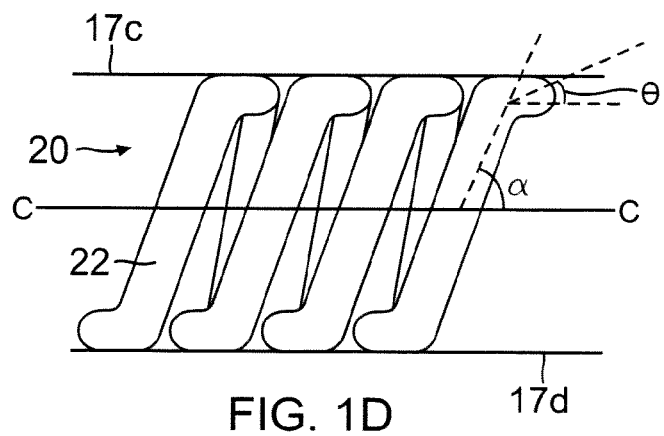
FIG. 1D is a side view of a canted coil spring provided according to aspects of the present apparatus, system, and method.

Referring to FIGS. 1A and 1C, partial cross-sectional views of an exemplary connector 10 are shown. The connector 10 may be used in a number of industries, such as consumer electronics, electrical transmissions, automotive, aerospace, medical, and military, to name a few. The connector 10 may include a shank 12 and a housing 14. The shank 12, which can also be a pin, a shaft or a rod, and the housing 14 include retention grooves 18 and 16, respectively, for receiving at least a portion of the canted coil spring 20. In the exemplary embodiments described herein, the groove 16 is defined by a side wall 17a, side wall 17b, and a top wall 17c located between the side walls 17a and 17b, all of which are collectively referred to as walls 17 of the groove 16. The groove 18 is defined by side wall 17a, side wall 17b, and a bottom wall 17d located between the side walls 17a and 17b, all of which are collectively referred to as walls 17 of the groove 18. In the exemplary embodiments disclose herein, each of the sidewalls 17a, 17b, the top wall 17c, and the bottom wall 17d has a flat surface for contacting the coils 22 of the canted coil spring 20. In the following, the groove 16 or the groove 18 may collectively be referred to as the groove 16 when generally describing contact between a canted coil spring 20 and the grooves 16 and/or 18. The canted coil spring 20 may provide a latching or a locking connection (shown in FIG. 1C) between the shank 12 and the housing 14, function as part of a seal assembly for sealing the connection between the shank 12 and the housing 14, and/or serve as a conduit for heat transfer and/or electrical current transfer between the shank 12 and the housing 14. In alternative embodiments, the housing or the shank but not both has a groove so that the connector provides holding capability.

Figure 2A:
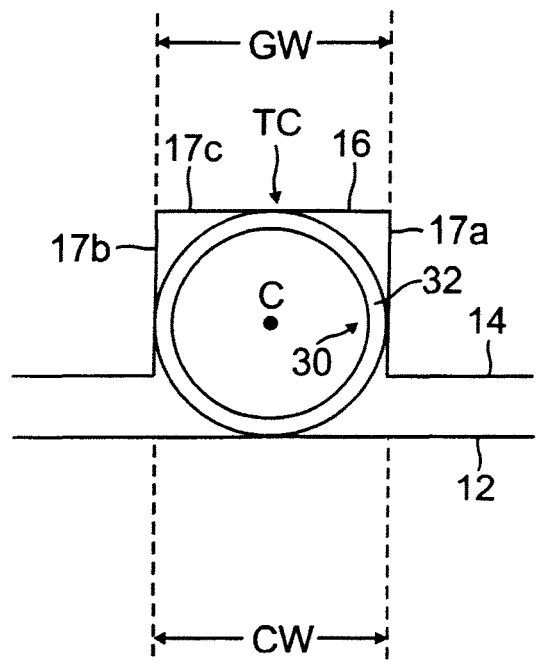
FIG. 2A is a cross-sectional view of a connector having a canted coil spring with an elliptical or circular cross section.
Figure 2B:
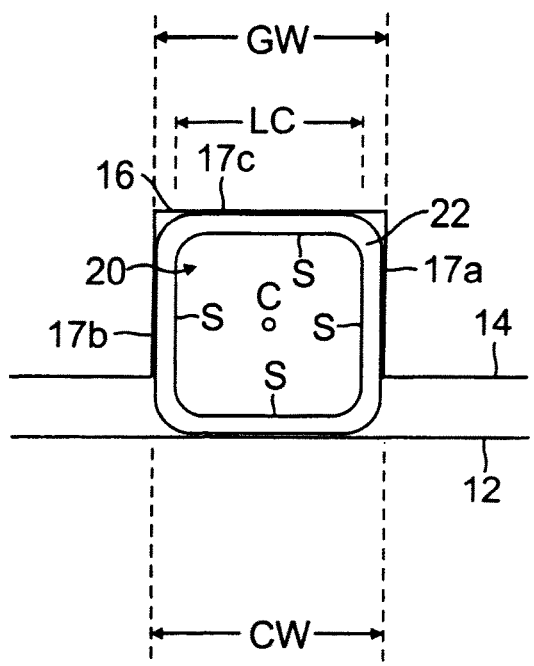
FIG. 2B is a top view of the connector and the canted coil spring of FIG. 2A showing contact between a coil of the canted coil spring and a flat surface of the connector.

Referring to FIG. 2A, a cross section of the connector 10 and a canted coil spring 30 is shown. The canted coil spring 30 has an elliptical or a circular cross section with an outer diameter or coil width CW that substantially corresponds to the width GW of the groove 16 (the shaft 12 of FIG. 2A is shown without a groove 18). With the groove 16 being rectangular and the canted coil spring 30 being elliptical or circular in cross section, contacts between the coils 32 of the canted coil spring 30 and the flat surfaces of the walls 17 of the groove 16 when the coils 32 are in an unbiased state occur at a tangential contact surface area TC shown in FIG. 2B. The contact surface area TC is shown with dashed lines around a contact point P, which mathematically characterizes the contact between the elliptical or circular coil 32 of the canted coil spring 30 and the flat surfaces of the walls 17 of the groove 16 (i.e., tangential or point contact between an ellipse or a circle and a square or a rectangle). As is readily apparent to a person of ordinary skill in the art, the greater the contact surface area between the coils 32 of the canted coil spring 30 and the groove 16, the greater the bandwidth for flow between the shank 12 and the housing 14 via the coils. For example, in applications where the canted coil spring 30 functions as a heat transfer conduit or an electrical current conduit between the shank 12 and the housing 14, a larger contact surface area than the contact surface area TC of FIG. 2A would provide greater heat or electrical conductivity between the shank 12 and the housing 14. As described in detail in the following, a canted coil spring according to aspects of the present apparatus, system and method can increase the contact surface area between the canted coil spring and the flat surfaces of the walls 17 of the groove 16 as compared to the canted coil spring 30 of FIG. 2A. As described, the present apparatus, system and method may be understood to include a connector having increased contact surfaces between a canted coil spring having a plurality of coils and a pair of grooves defining a spring retention groove. The increased contact surfaces lower current or electrical resistance by providing more flow paths between the retention groove and the spring.

Figure 2C:
FIG. 2C is another cross-sectional view of the connector and the canted coil spring of FIGS. 1A-1D.
Figure 2D:
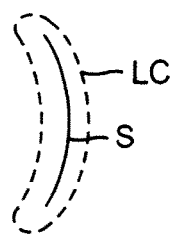
FIG. 2D is a top view of the connector and the canted coil spring of FIG. 2C showing contact between a coil of the canted coil spring and a flat surface of the connector.

Referring back to FIGS. 1B and 1C and also referring to FIGS. 2C and 2D, the canted coil spring 20 according to one exemplary embodiment includes a plurality of coils 22 that are generally canted at an acute coil angle α relative to a centerline C. At least one coil 22 has a non-circular or non-elliptical cross-sectional shape (e.g., appears to have a non-circular or non-elliptical cross-sectional shape when viewed in the direction of the centerline C). In the exemplary embodiment shown in FIGS. 1A-D and 2C-D, the canted coil spring 20 includes coils 22 that have a substantially square cross-sectional shape (e.g., square with rounded corners) or a substantially rectangular cross-sectional shape (e.g., rectangular with rounded corners) when the coils 22 are in an unbiased state. As used herein, unbiased state is understood to mean lack of external forces tending to cant the coils. Accordingly, when viewed in the direction of the centerline C, which is the view shown in FIGS. 1C and 2B, the coils 22 of the canted coil spring 20 have four sections S that appear to be linear. The sections S may in fact have a curved shape or have a non-linear shape and may only appear linear when the coil 22 is viewed in the direction of the centerline C. The contact surface areas LC between the flat surfaces of the walls 17 of the groove 16 and the corresponding sections S of the coil 22, which is shown in FIG. 2D with dashed lines, is an area defined by a curved line S that mathematically characterizes the contact between the section S and the flat surfaces of the walls 17 of the groove 16. Therefore, one of ordinary skill in the art will readily recognize that the contact surface area LC between the coils 22 and the flat surfaces of the walls 17 of the groove 16 is greater than the contact surface area TC of the coils 32 of the canted coil spring 30 of FIGS. 2A-B. According to aspects of the present apparatus, system and method, the larger contact surface area between each coil is provided by the section S of the coil being bent toward the centerline so as to provide a more flat engagement area with the flat surfaces of the walls 17 of the groove 16. Thus, the coil may be viewed as having a first coil section formed along a first plane and a bent section formed continuously with the first coil section formed along a second plane, which is at an angle with the first plane.

In the exemplary embodiment shown in FIGS. 1A-D and 2C-D, the sections S have an acute coil angle θ relative to the centerline C which is smaller than the acute coil angle α. Coil angle α and coil angle θ may also be referred to herein as the first coil angle and the second coil angle, respectively. Depending on the functional requirements of a canted coil spring in a particular application, a canted coil spring according to aspects of the present apparatus, system and method can be fabricated to have one or more coils having a second coil angle that is less than or greater than the first coil angle.

Figure 3A:
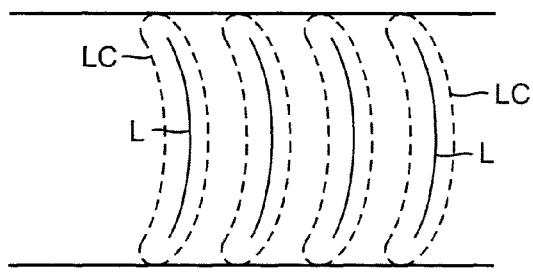
FIGS. 3A-3D are a top view, a side view, a bottom view and a cross-sectional view of a canted coil spring provided according to aspects of the present apparatus, system and method, where contact between the canted coil spring and flat surfaces of a groove of a connector is shown.
Figure 3B:
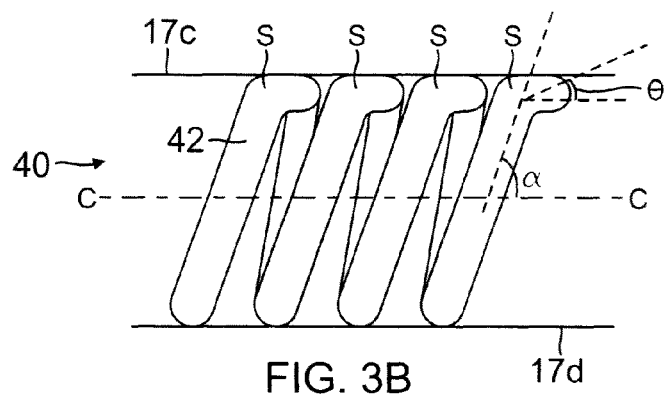
Figure 3C:
Figure 3D:
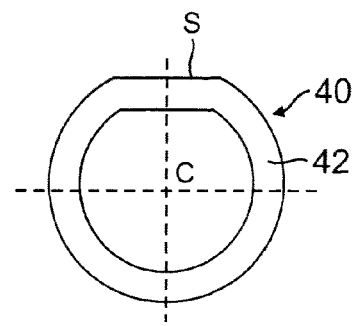

In one exemplary embodiment shown in FIGS. 3A-3D, a canted coil spring 40 has one or more coils 42 which only have one section S that provides a contact surface area LC with one of the flat surface of the wall 17c of the groove 16. As shown in FIG. 3B, the section S has a second coil angle θ that is less than the first coil angle α. However, as shown in FIG. 3D, the remaining portions of the coils 42 do not have any sections S with a second coil angle, and as a result, have a circular or an elliptical cross-sectional shape. Accordingly, as shown in FIG. 3A, the section S on top of the coils 42 provides a contact surface area LC defined by the line L between the coils 42 and the flat surface of the wall 17c of the groove 16, while as shown in FIG. 3C, the remaining portions of the coils 42 provide contact surface areas TC (not shown) defined by points P between the canted coil spring 40 and the flat surfaces of the other walls 17 of the groove 16.

Figure 4A:
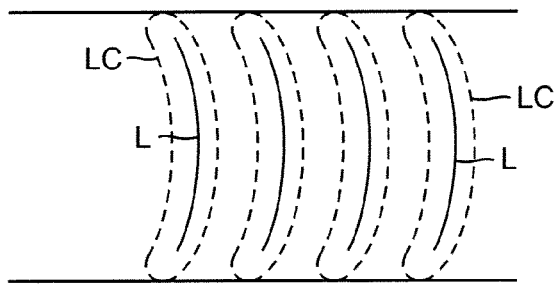
FIGS. 4A-4D are a top view, a side view, a bottom view and a cross-sectional view of another canted coil spring provided according to aspects of the present apparatus, system and method, where contact between the canted coil spring and flat surfaces of a groove of a connector is shown.
Figure 4B:
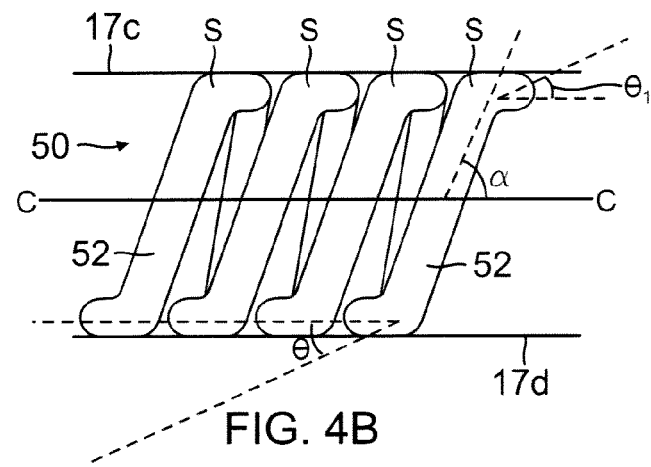
Figure 4C:
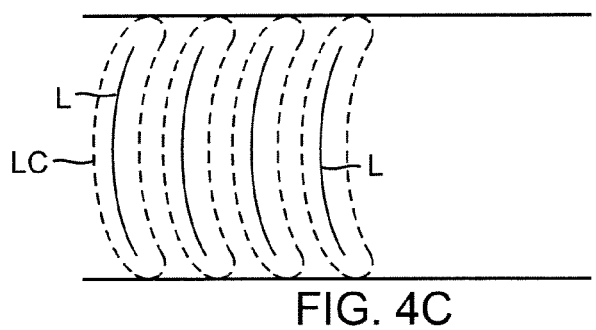
Figure 4D:
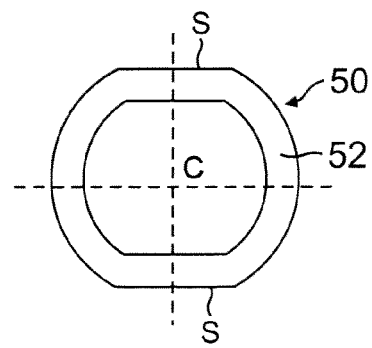

In another exemplary embodiment shown in FIGS. 4A-4D, a canted coil spring 50 has one or more coils 52 which have two sections S opposite to each other relative to the centerline C that provide contact surface areas LC with flat surfaces of opposing walls 17 of the groove 16. As shown in FIG. 4B, the sections S have a second coil angle θ that is less than the first coil angle α. However, as shown in FIG. 4D, the remaining portions of the coils 52, which are the portions on the sides of the coil 52, do not have any sections S with a second coil angle, and as a result, have a circular cross-sectional shape or an elliptical cross-sectional shape. Accordingly, as shown in FIGS. 4A and 4C, the sections S on top and the bottom of the coils 52 provide contact surface areas LC between the coils 52 and the flat surfaces of the walls 17c and 17d of the grooves 16 and 18, respectively, while the remaining portions of the coils 52 provide contact surface areas TC (not shown) between the canted coil spring 50 and the flat surfaces of the walls 17a and 17b of the grooves 16 and 18.

Figure 5A:
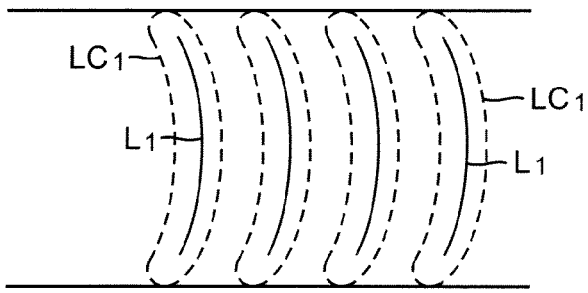
FIGS. 5A-5D are a top view, a side view, a bottom view and a cross-sectional view of another canted coil spring provided according to aspects of the present apparatus, system and method, where contact between the canted coil spring and flat surfaces of a groove of a connector is shown.
Figure 5B:
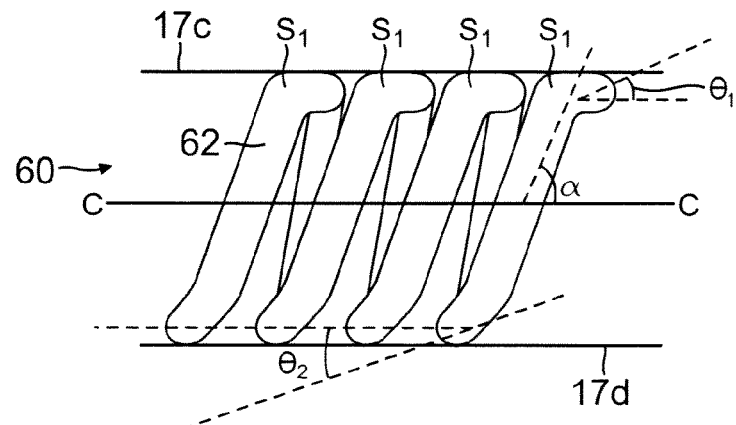
Figure 5C:
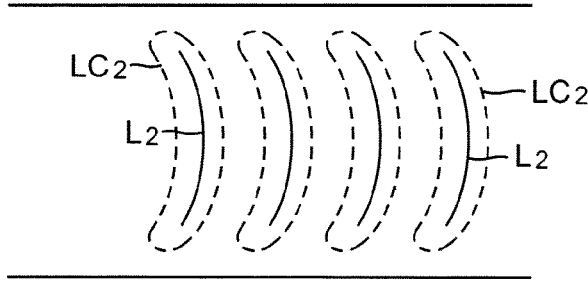
Figure 5D:
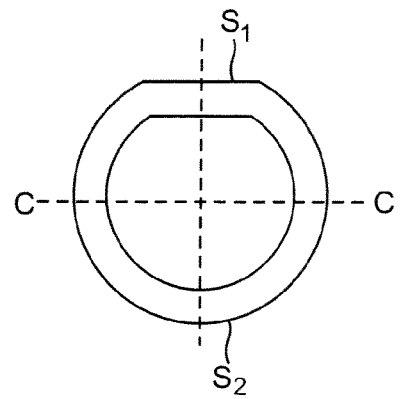

In another exemplary embodiment shown in FIGS. 5A-5D, a canted coil spring 60 has one or more coils 62 which have two sections S1 and S2 opposite to each other relative to the centerline C that provide contact surface areas LC1 and LC2, respectively, with flat surfaces 17 of two opposing walls of the groove 16. As shown in FIG. 5B, the sections S1 have a second coil angle θ1 that is less than the first coil angle α. The sections S2 have a second coil angle θ2 that is also less than the first angle α. However, in contrast to the embodiment of FIGS. 4A-4D, the second coil angle θ1 of the sections S1 on top of the coils 62 is different than the second coil angle θ2 of the sections S2 on the bottom of the coils 62. Accordingly, as shown in FIGS. 5A and 5C, the sections S1 on top and the sections S2 on the bottom of the coils 62 provide different contact surface areas LC1 and LC2, respectively, between the coils 62 and the flat surfaces of the walls 17c and 17d of the grooves 16 and 18, respectively. The remaining portions of the coils 62, which are portions on the sides of the coil 62, do not have any sections S with a second coil angle, and as a result, have a circular cross-sectional shape or an elliptical cross-sectional shape as shown in FIG. 5D. These circular or elliptical portions of the coil 62 provide contact surface areas TC (not shown) between the canted coil spring 62 and the flat surfaces of the side walls 17a and 17b of the groove 16. The spring 60 may be used in applications where initially the contact surface area between one side of the spring and the flat surface of the corresponding side wall 17 should be greater than the other side of the spring. For example, in the unbiased state of the spring 60 shown in FIG. 5B, the contact surface area between sections S1 and the flat surface of the top wall 17c is greater than contact surface area between the sections S2 and the flat surface of the bottom wall 17d. However, as the spring 60 is compressed, the contact surface area between the sections S2 and the flat surface of the bottom wall 17d increases, which is a feature that may be preferred in certain applications. For example, because the contact surface area at section S2 increases with compression of the spring, the sections S1 may provide a preferred level of electrical conductivity through the spring, while the contact surface area S2 provides an increased preferred level of conductivity through the spring, which can be achieved through increased compression of the spring. In other embodiments, the wall surfaces of the retention groove may be tapered or modified to increase surface contacts with the coils. In other words, the coils, the retention groove, or both may be modified to increase surface contacts.

Figure 6:
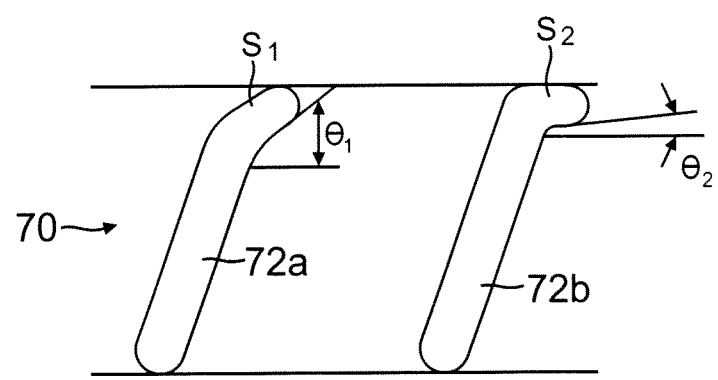
FIG. 6 is a side view of another canted coil spring provided according to aspects of the present apparatus, system and method wherein each coil of the spring is shown to have two secondary coil angles.

In another exemplary embodiment shown in FIG. 6, a canted coil spring 70 may have coils 72a and 72b that include sections S1 and S2 on one side or the same side thereof with different second coil angles θ1 and θ2, respectively. For example, the coil 72a may have section S1 with a second coil angle θ1, while a second coil 72b may have a section S2 on the same side of the canted coil spring 70 with a second coil angle θ2 that is different from the second coil angle θ1. Accordingly, the coils 72a and 72b provide different contact surface areas LC (not shown) with the flat surface of the same wall 17 of the groove 16. The sections S2, which are shown to have a smaller second coil angle θ, are used to provide high contact surface area with the flat surface of the wall 17 in the unbiased state of the spring 70 and during moderate deflection of the spring 70. The sections S1, however, which are shown to have a larger second coil angle θ, provide a high contact surface area during excessive deflection. Thus, in the embodiments disclosed herein where the second coil angles θ on the same side of the canted coil spring vary from one or more coils to one or more other coils, the sections of the coils associated with the varying second coil angles provide high contact surface areas with the flat surfaces of the walls 17 for different deflection ranges of the spring.

Figure 7A:
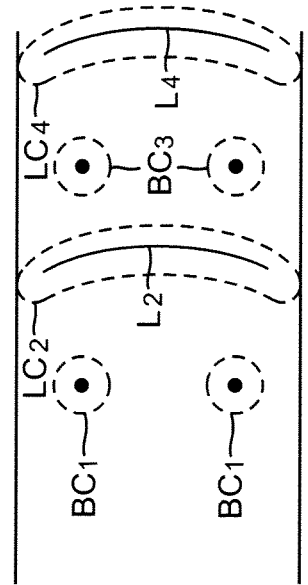
FIGS. 7A-7B are a top view and a side view of one example of a canted coil spring according to the embodiment of FIG. 6, where contact between the canted coil spring and flat surfaces of a groove of a connector is shown.
Figure 7B:
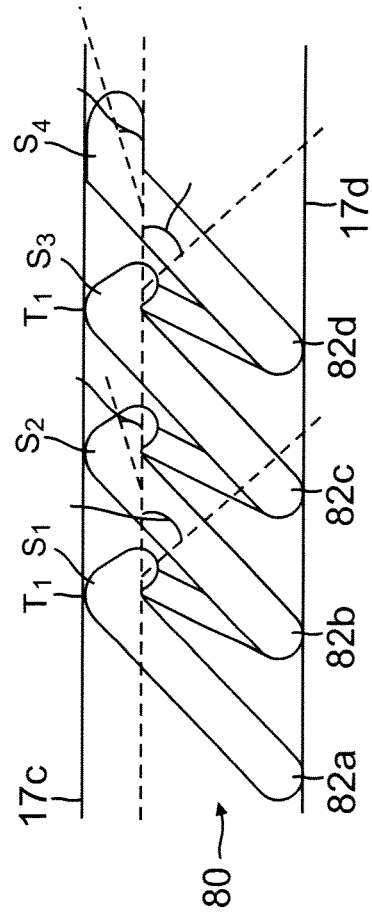

An example of a canted coil spring 70 according to the embodiment of FIG. 6 is shown in FIGS. 7A-7B. The first coil 72a as viewed from left to right in FIG. 7A has a section S1 with a second coil angle θ1 such that the section S1 provides a contact surface area LC1 with the flat surface of the wall 17c. The second coil 72b has a section S2 with a second coil angle θ2 which is greater than θ1 and slightly less than the first coil angle α. Accordingly, the contact surface area LC2 between the second coil 72b and the flat surface of the wall 17c is smaller than LC1, yet greater than a tangential or point contact TC (not shown) of a typical canted coil spring 30 as shown in FIG. 2A. The third coil 72c and the fourth coil 72d have sections S3 and S4 with different second coil angles θ3 and θ4 which provide different contact surface areas LC3 and LC4, respectively. Therefore, in the exemplary embodiment of FIGS. 7A-7B, the coils 72a-d of the canted coil spring 70 may have different second coil angles θ1-θ4 in order to provide different surface contact areas LC1-LC4 with the flat surfaces of the walls 17.

Figure 8A:
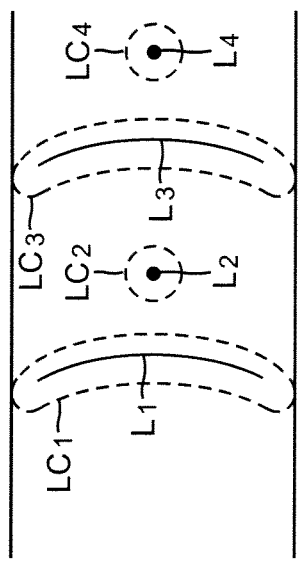
FIGS. 8A-8B are a top view and a side view of another example of a canted coil spring according to the embodiment of FIG. 6, where contact between the canted coil spring and flat surfaces of a groove of a connector is shown.
Figure 8B:
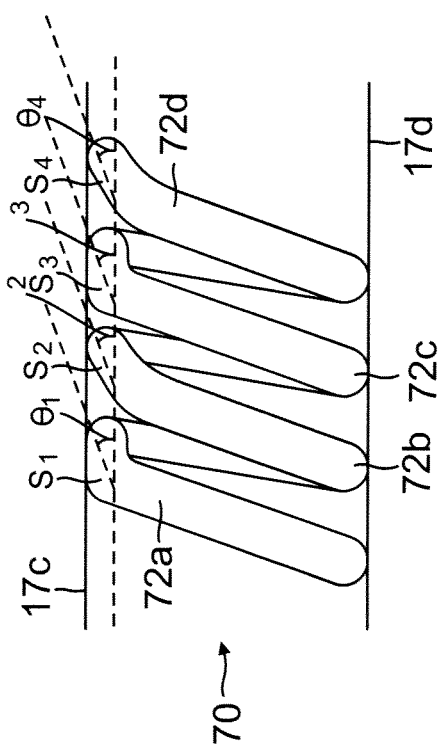

In another exemplary embodiment shown in FIGS. 8A-8B, a canted coils spring 80 has one or more coils 82a-b with sections S1-S4, where one or more of the sections have negative acute second coil angles relative to the centerline C. The first coil 82a (viewed from left to right in FIG. 8B) has a second coil angle θ1, which is a negative acute angle relative to the centerline C. In other words, the section S1 of the coil 82a extends towards the centerline C rather than extending away from the centerline C. Accordingly, two curved transition areas T1 and T2 (only area T1 is shown in FIG. 8B), which define the transition areas between the section S1 and S3 of the coil 82a and 82c and the remaining portions of the coil 82a and 82c, respectively, form two spaced apart contact surface areas BC1 and BC3 between the coils 82a and 82c, respectively, and the flat surface of the wall 17c. Depending on the sharpness of the curvature of the transition areas T1 and T2, the contact surface areas may provide tangential or point contacts TC or line contact LC between the spring 80 and the flat surfaces of the walls 17. For example, a slow or shallow transition curve T1 provides a line contact area LC while a fast or shape transition T1 may provides a tangential or point contact between the spring 80 and the flat surface of the wall 17c. In this embodiment, the canted coil spring 82 is shown to have two coils 82a and 82c with sections S1 and S3, respectively, having negative second coil angles θ1 and θ3, respectively, and two coils 82b and 82d with sections S2 and S4, respectively, having positive second coil angles θ2 and θ4.

Figure 9B:
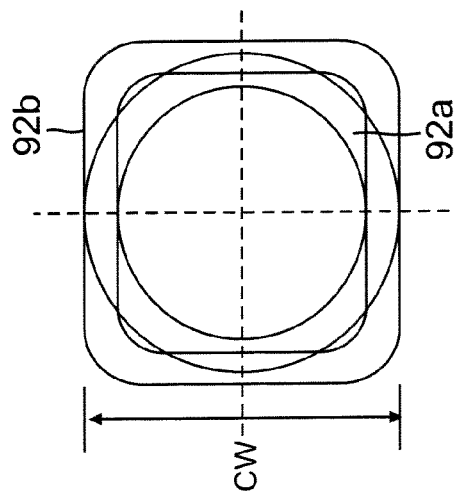
FIGS. 9A and 9B are a side view and a cross-sectional view of a canted coil spring provided according to another aspect of the present apparatus, system and method with the canted coil spring shown to include alternately configured coils of circular or elliptical cross-sectional shape and coils of non-circular or non-elliptical cross-sectional shape, where the coils have approximately the same coil width.
Figure 9A:
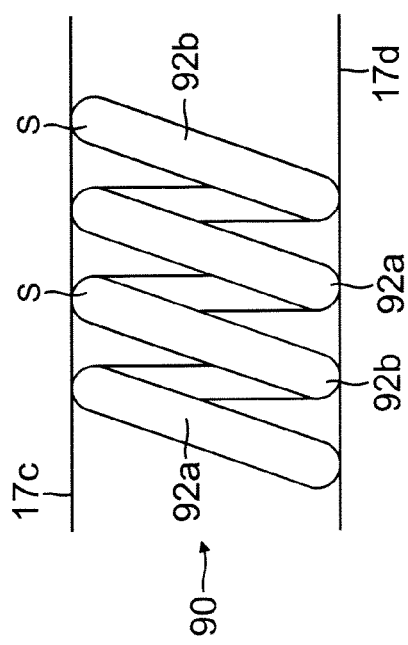

In another exemplary embodiment shown in FIGS. 9A-9B, a canted coil spring 90 has coils 92a that have circular or elliptical cross-sectional shapes alternately arranged between coils 92b that have one or more sections S that when viewed in the direction of the centerline C appear to have non-circular or non-elliptical shapes (shown in FIG. 9B). In this exemplary embodiment, both the coils 92a and 92b have the same coil width CW. The coils 92a and 92b are not limited to the alternate arrangement discussed above and can be arranged in any manner in order to achieve a desired function for the spring in a particular application.

Figure 10B:
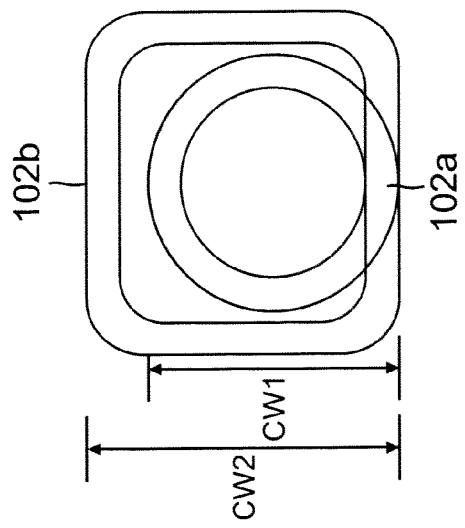
FIGS. 10A and 10B are a side view and a cross-sectional view of a canted coil spring provided according to another aspect of the present apparatus, system and method with the canted coil spring shown to include alternately configured coils of circular or elliptical cross-sectional shape and coils of non-circular or non-elliptical cross-sectional shape, where the coils have different coil widths.
Figure 10A:
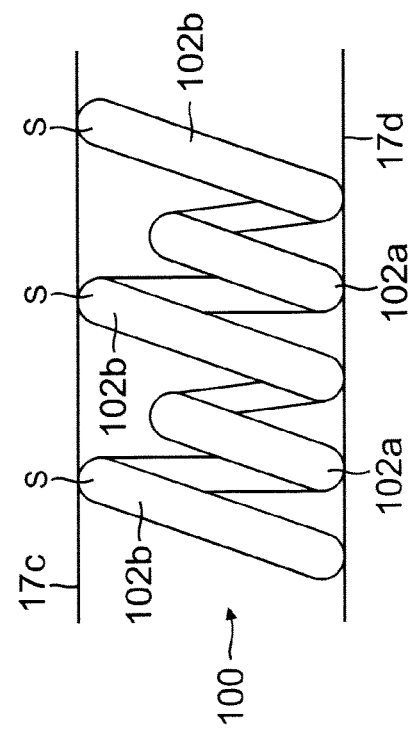

In another exemplary embodiment shown in FIGS. 10A-10B, a canted coil spring 100 has coils 102a that have circular or elliptical cross-sectional shapes alternately arranged between coils 102b that have one or more sections S that when viewed in the direction of the centerline C appear to have non-circular or non-elliptical shapes (shown in FIG. 10B). In this exemplary embodiment, the first coils 102a have a smaller coil width CW1 than the coil width CW2 of the second coils 102b. In this exemplary embodiment, both the coils 92a and 92b have the same coil width CW. The coils 102a and 102b are not limited to the alternate arrangement or the relative sizes discussed above and can be arranged and sized in any manner in order to achieve a desired function for the spring in a particular application.

Figure 11A:
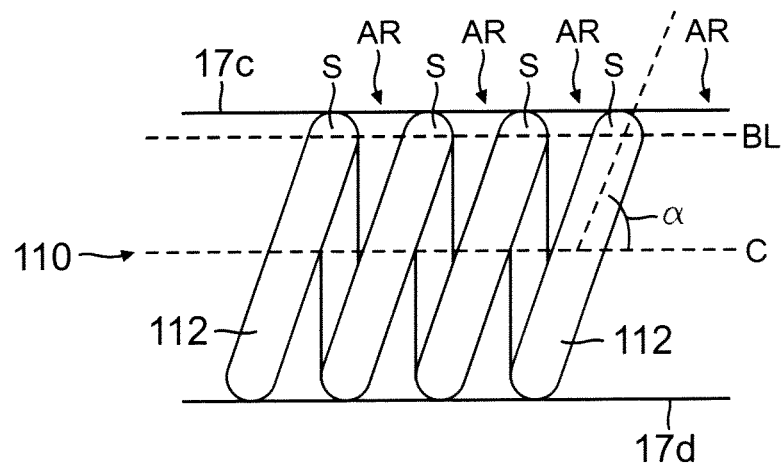
FIGS. 11A and 11B are side views illustrating an exemplary method of fabricating a canted coil spring.
Figure 11B:
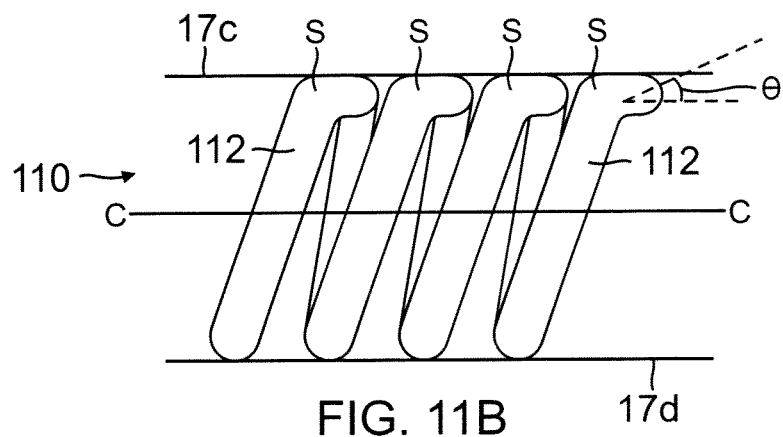

Referring now to FIGS. 11A-11B, an exemplary method of fabricating a canted coil spring 110 is shown. The canted coil spring 110 may be fabricated as a typical canted coil spring having the first coil angle α as shown in FIG. 11A by methods that are known to those of ordinary skill in the art. During or subsequent to such fabrication, one or more sections S of one or more of the coils 112 are bent at a bending line BL in the direction of the arrow AR to the same or different second coil angle θ as shown in FIG. 11B. The coils 112 can be bent at the same bending line BL, which is shown as an example in FIGS. 11A-11B, or can be bent at different bending lines (not shown). In FIG. 11B, only the top portion of the coil 112 is bent at the bending line BL to provide sections S. However, other sides of the coils 112 can be similarly bent in order to provide multiple sides on each coil having sections S for contacting flat surfaces of one or more walls 17 of the groove 16 and 18 at contact surface areas LC as discussed herein. For example, the canted coil spring 20 of FIGS. 1A-1D has coils 22 that are fabricated by bending each coil 22 on four sides to provide a square or rectangular cross section for each coil 22. In a further example, the canted coil spring 50 of FIGS. 4A-4D has coils 52 that are fabricated by bending each coil 52 on two opposing sides to provide two opposing sections S. In yet a further example, the groove 16 may be hex shaped (not shown). Accordingly, the coils of a canted coil spring can be bent on six sides (not shown) in order to substantially correspond to the hex shape of the groove and increase contact surface areas between the canted coil spring and the flat surface of the walls of the groove. Therefore, one of ordinary skill in the art will readily appreciate that the coils of a canted coil spring can be fabricated to have any shape so as to correspond with the shape of a groove and thereby increase the contact surface areas between the coils of the canted coil spring and the flat surface of the walls of the groove.

In the exemplary embodiments of the canted coil spring and method of fabricating the canted coil spring discussed above, one or more sections of one or more coils of a typical canted coil spring are bent at the same or various second coil angles in order to increase the contact surface area between the coils and the flat surface of the walls of a groove. In these exemplary springs, a coil when viewed in the direction of the centerline C appears to have one or more sections that are linear. As described above, however, these sections are in fact curved and only appear to be linear when viewed in the direction of the centerline C because they are bent at a second coil angle relative to the centerline C. As discussed below, canted coil springs according to other exemplary embodiments are fabricated with one or more coils having one or more actual linear sections in order to increase contact surface area with one or more flat surface of the walls of the groove.

Figure 12A:
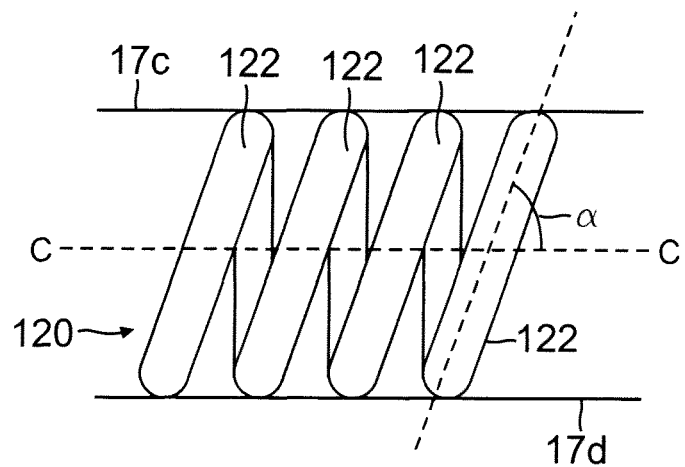
FIGS. 12A-12C are a side view, a cross-sectional view, and a top view of another exemplary canted coils spring provided according aspects of the present apparatus, system and method and showing the spring contacting flat surfaces of a groove of a connector.
Figure 12B:
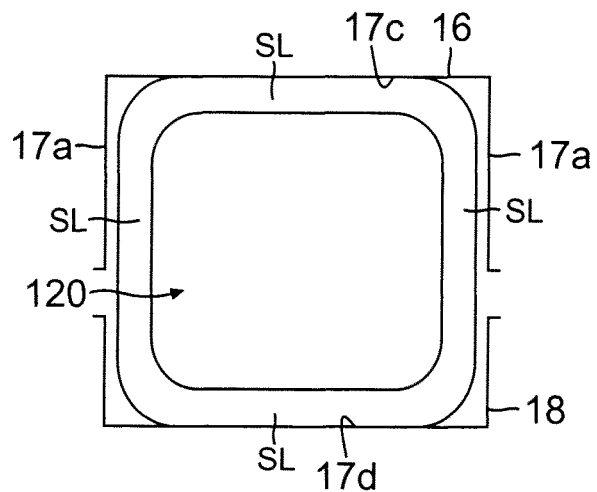
Figure 12C:
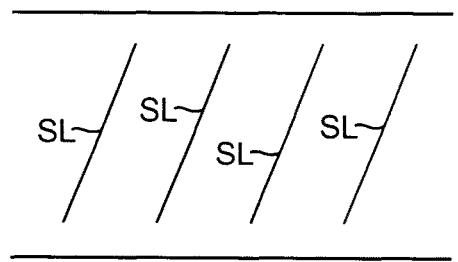

In one exemplary embodiment, a canted coil spring according to aspects of the present apparatus, system and method includes one or more sections of one or more coils that are linear so as to provide a line contact with the flat surface of one or more walls of the groove 16. Referring to FIG. 12A, one or more coils 122 of the canted coil spring 120 includes four linear sides SL that may have the same or different length so as to provide a square or rectangular cross-sectional shape. Accordingly, these coils 122 of the canted coil spring 120 are configured at the first coil angle α relative to the centerline C and do not have a section bent at a second coil angle relative to the centerline C. Referring to FIGS. 12B and 12C, the contact areas between the coils 122 and the flat surface of the wall of the groove 16 are actual line contacts. Although the canted coil spring 120 is shown to have four linear sections, one of ordinary skill in the art will readily recognize that one or more coils 122 of the canted coil spring 120 can have portions that are curved and sections that are formed as linear segments.

A canted coil spring according to aspects of the present apparatus, system and method can provide thermal or electrical conductivity between two parts, such as a connector having male and female parts similar to the shaft 12 and the housing 14 of the connector 10 of FIG. 1A. Thermal and electrical conductivity for the canted coil spring at each coil, around each coil, and based on operative compression range of each coil or various lengths of the spring can be designed based on the particular requirements of each application by providing similar or different levels of contact surface area between the coils and the male and female parts for different compression levels of the spring. The different levels of contact surface area in the unbiased state of the spring or during compression of the spring can be achieved by varying the magnitude of the second coil angle at one or more sections on each coil, varying the magnitude of the second coil angles of one or more coils relative to other coils, and/or varying the coil widths and cross-sectional shapes based on an alternating or other patterns.

Although limited embodiments of canted coil springs and method of fabricating the canted coil springs have been specifically described and illustrated herein, many modifications and variations will be apparent to those skilled in the art. Accordingly, it is to be understood that the canted coil springs and methods of fabricating these springs according to principles described herein may be embodied other than as specifically described herein. The canted coil springs and methods of fabricating these springs are also defined in the following claims.

What is claimed is:

1. An electrical connector comprising:
a housing made, at least in part, from an electrically conductive material comprising a bore and a groove located within the bore, said groove comprising two sidewalls and a bottom wall located therebetween;
a pin made from an electrically conductive material comprising an elongated body positioned within the bore; and
a canted coil spring positioned in the groove of the housing and contacting the pin, the canted coil spring comprising a plurality of canted coils generally canted in a first direction relative to a centerline extending through the coils;
wherein at least two of the plurality of canted coils, each when viewed in a direction of the centerline, comprises a curved first section along a first path and defining a first contact surface area when contacting a flat surface, the first section being formed continuously with a second section bent in a second direction defining a second path different from the first path so as to define a second contact surface area that is larger than the first contact surface area between the second section and at least one of the housing and the pin.

2. The electrical connector of claim 1, wherein the at least two coils, each when viewed in the direction of the centerline, comprises at least one linear segment that provides the second contact surface area between the second section and at least one of the housing and the pin, the second contact surface area being defined along a line.

3. The electrical connector of claim 1, wherein the plurality of coils comprise at least one coil that, when viewed in the direction of the centerline, comprises an elliptical shape or a circular shape.

4. The electrical connector of claim 1, wherein the groove is a first groove, the connector further comprising a second groove comprising two sidewalls and a bottom wall located therebetween formed on the pin and having the canted coil spring positioned therein.

5. The electrical connector of claim 4, wherein the bottom wall of the second groove is tapered relative to at least one of the two sidewalls of the second groove.

6. The electrical connector of claim 1, wherein the second section contacts the groove of the housing, and wherein a third section on each of the at least two canted coils is bent in a third direction different from the first and second directions and defining a third path different from the first and second paths so as to define a third contact surface area that is larger than the first contact area at which to contact the pin.

7. The electrical connector of claim 6, wherein the third section contacts a bottom wall of a groove formed on the pin.

8. The electrical connector of claim 1, wherein the bottom wall of the groove of the housing is tapered relative to at least one of the two sidewalls.

9. An electrical connector comprising:
a pin comprising an elongated body having a groove comprising two sidewalls and a bottom wall located therebetween;
a housing comprising a bore having the pin positioned therein; and
a canted coil spring located in the groove comprising:
a plurality of canted coils generally canted in a first direction relative to a center line extending through the coils;
wherein at least two of the plurality of canted coils, each when viewed in a direction of the centerline, comprises a curved first section along a first path and defining a first contact surface area when contacting a flat surface, the first section being formed continuously with a second section bent in a second direction defining a second path different from the first path so as to define a second contact surface area that is larger than the first contact surface area between the second section and at least one of the housing and the pin.

10. The electrical connector of claim 9, wherein the at least two coils, each when viewed in the direction of the centerline, comprises at least one linear segment that provides the second contact surface area between the second section and at least one of the housing and the pin, the second contact surface area being defined along a line.

11. The electrical connector of claim 9, wherein the plurality of coils comprise at least one coil that, when viewed in the direction of the centerline, comprises an elliptical shape or a circular shape.

12. The electrical connector of claim 9, wherein the groove is a first groove, the electrical connector further comprising a second groove comprising two sidewalls and a bottom wall located therebetween formed in the bore of the housing and having the canted coil spring positioned therein.

13. The electrical connector of claim 12, wherein the bottom wall of the second groove is tapered relative to at least one of the two sidewalls of the second groove.

14. The electrical connector of claim 9, wherein the second section contacts the groove of the pin and wherein a third section on each of the at least two canted coils is bent in a third direction different from the first direction so as to contact the housing.

15. The electrical connector of claim 14, wherein the groove is a first groove, wherein a second groove having a bottom wall is formed in the housing, and wherein the third section contacts the bottom wall of the second groove.

16. The electrical connector of claim 9, wherein the bottom wall of the groove of the pin is tapered relative to at least one of the two sidewalls.

17. A method for increasing the area of surface contacts in an electrical connector, the method comprising:
fabricating a wire in a canted helical configuration thereby forming a plurality of coils canted in a first direction relative to a centerline extending through the coils, wherein at least one coil of the plurality of coils, when viewed in a direction of the center line, comprises a curved first section along a first path and defining a first contact surface area when contacting a flat surface;
bending at least one section of the at least one coil in a second direction to form a second section that is continuous with the first section, wherein the second direction defines a second path different from the first path so as to define a second contact surface area that is larger than the first contact surface area; and placing the plurality of coils in a groove comprising two sidewalls and a bottom wall so that the second section of the at least one coil contacts the bottom wall along the second contact surface area.

18. The method of claim 17, comprising bending at least another section of the at least one coil to form a third section bent in a third direction different from the first direction.

19. The method of claim 18, wherein the groove is located in a bore of the housing.

20. The method of claim 19, wherein the third section contacts a bottom wall of a groove formed on a pin positioned in the bore.

21. An electrical connector, comprising:
a housing defining a bore;
a pin positioned longitudinally in the bore;
at least one of the housing and the pin defining a groove communicating with the bore; and
a canted coil spring disposed in the groove so as to contact the housing and the pin, the spring comprising a plurality of coils canted in a first direction relative to a center line extending through the coils;
wherein each of at least two of the plurality of coils, when viewed in a direction of the centerline, comprises a curved first section defining a first contact surface area between the first section and at least one of the housing and the pin, the first section being continuous with a second section angled in a second direction different from the first direction so as to provide a second contact surface area between the second section and at least one of the housing and the pin, the second contact surface area being larger than the first contact surface area.

22. The electrical connector of claim 21, wherein the groove is defined in the housing.

23. The electrical connector of claim 21, wherein the groove is defined in the pin.

24. The electrical connector of claim 21, wherein the second section provides a first contact surface area defined along a first line on the housing, and wherein each of the at least two coils includes a third section continuous with the first section and bent in a third direction different from the first direction and defining a second contact area defined along a second line on the pin.

25. The electrical connector of claim 21, wherein the second contact surface area is defined along a line.

* * * * *